428-408

7/20/82 XR 4,340,619 SR

United States Patent [19] [11] 4,340,619

Gaul, Jr. [45] Jul. 20, 1982

[54] PROCESS FOR THE PREPARATION OF POLY(DISILYL)SILAZANE POLYMERS AND THE POLYMERS THEREFROM

[75] Inventor: John H. Gaul, Jr., Midland, Mich.

[73] Assignee: Dow Corning Corporation, Midland, Mich.

[21] Appl. No.: 225,274

[22] Filed: Jan. 15, 1981

[51] Int. Cl.[3] ............ B05D 3/02

[52] U.S. Cl. ............ 427/228; 264/29.2; 264/29.5; 264/29.6; 427/387; 428/408; 428/447; 521/154; 521/919; 528/31; 528/32; 528/33; 528/36; 528/38

[58] Field of Search ............ 528/31, 32, 33, 36, 528/38; 526/279; 423/344, 345, 347; 264/29.1, 29.2, 29.3, 29.4, 29.5, 29.6; 427/387, 228; 428/447, 408; 521/154, 919

[56] References Cited

U.S. PATENT DOCUMENTS

| | | | |
|---|---|---|---|
| 3,738,906 | 6/1973 | Olcott | 264/29.5 X |
| 3,853,567 | 12/1974 | Verbeek | 106/44 |
| 3,882,210 | 5/1975 | Crossley et al. | 423/345 X |
| 3,892,583 | 7/1975 | Winter et al. | 106/55 |
| 3,960,619 | 6/1976 | Seiter | 423/345 X |
| 4,067,955 | 1/1978 | Noakes et al. | 423/345 |
| 4,105,455 | 8/1978 | Koga et al. | 423/345 X |
| 4,267,211 | 5/1981 | Yajima et al. | 427/228 |

*Primary Examiner*—John D. Smith
*Assistant Examiner*—Thurman K. Page
*Attorney, Agent, or Firm*—Robert L. McKellar

[57] ABSTRACT

What is disclosed is a process for preparing $R'_3SiNH$-containing silazane polymers by contacting and reacting chlorine-containing disilanes with $\{R'_3Si\}_2NH$ where R′ is vinyl, hydrogen, an alkyl radical of 1-3 carbon atoms or the phenyl group. The silazane polymers are useful as chemical intermediates to produce silicon-containing chemical compounds. They are also useful in the formation of silicon carbide-containing ceramic materials.

89 Claims, No Drawings

PROCESS FOR THE PREPARATION OF POLY(DISILYL)SILAZANE POLYMERS AND THE POLYMERS THEREFROM

BACKGROUND OF THE INVENTION

This invention relates to the preparation of silazane polymers. These polymers are useful as chemical intermediates to synthesize organosilicon compounds. They are also useful, when fired at high temperatures, to form silicon carbide and silicon carbide containing ceramic materials.

What is disclosed herein is a novel process to obtain novel silazane polymers which consists of contacting and reacting chlorine-containing disilanes with disilazanes in an inert, essentially anhydrous atmosphere while distilling volatile by-products.

As is well-known in the art, halosilane monomers will react with ammonia and most organic compounds containing a primary or secondary amino group to give a variety of silazanes. For example, the reaction of trimethylchlorosilane and ammonia produces hexamethyldisilazane, a silazane monomer, while dimethyldichlorosilane and ammonia produce dimethylcyclic silazanes. These two reactions probably constitute the majority of commercial uses of the silazane chemistry.

Silazanes in general have been academic curiosities for many years and a variety of such silazanes, including monomers, oligomers, cyclics and even low molecular weight resins and linear polymers have been prepared by a variety of methods. For example, L. W. Breed et al., in the Journal of Organic Chemistry, 27, 1114(1962) report the formation of silazanes from the polymerization of sterically hindered silazane oligomers, while in the Journal of Polymer Science, A 2 45(1964), cyclic trimer and tetramer silazanes are reported to be thermally cracked using catalysts to give linear polymers.

In contrast, fluids, rubbery polymers and resins prepared from $CH_3SiCl_3$, $(CH_3)_2SiCl_2$ and excess ammonia have been reported by Kruger et al. in the Journal of Polymer Science, A 2 3179(1964) and Redl, Silazane Polymer, ARPA-19, Advanced Research Projects Agency, October, 1965.

The patent literature also contains disclosures of the preparation of silazanes. Cheronis, in U.S. Pat. No. 2,564,674 discloses the preparation of low molecular weight linear silazane polymers by the reaction of halosilanes with excess ammonia in a solvent solution. Bausma, et al., in U.S. Pat. No. 3,809,713 discloses a similar reaction scheme with the added modification of removing the by-produced solid ammonium halide using ethylene diamine.

More recently, Verbeek, et al., in U.S. Pat. No. 3,853,567 and U.S. Pat. No. 3,892,583 disclosed that mixtures of $CH_3SiCl_3$ and $(CH_3)_2SiCl_2$ can be treated with ammonia or organoamines to form materials that can be pyrolyzed to yield $SiC/Si_3N_4$ ceramics.

As should be recognized by those skilled in the art, the present invention differs in at least one respect from all of the above art in that the present invention is based on chlorine-containing disilanes as opposed to the use of chlorine-containing monosilanes.

In another segment of the prior art, the use of disilanes in the preparation of silazane polymers has been limited to the formation of relatively low molecular weight materials. In one example, Wannagat et al., Ang. Chem. 75(7) 345(1963), reported the reaction of tetramethyldichlorodisilane with gaseous ammonia to give a six-membered cyclic silazane, $\{(CH_3)_2SiSi(CH_3)_2NH\}_2$, rather than the expected linear silazane polymer and Hengge et al., Montash. Chem. 101I(2)325(1970), prepared dimethylamino substituted mixtures of disilanes from dimethylamine and the chlorine-containing disilane mixture obtained from the Direct Process for the preparation of chlorosilanes.

What has been newly discovered is the coreaction between chlorine-containing disilanes and disilazanes to give high molecular weight silazane polymers.

THE INVENTION

The instant invention concerns a new class of silazane polymers prepared from chlorodisilanes. In essence, a single chlorine-containing disilane or a specified mixture of chlorine-containing disilanes is treated with a disilazane, as the nitrogen source, in sufficient amounts to react with all of the chlorine on the chlorine-containing disilanes. This is usually an equimolar amount of disilazane based on the chlorine content of the disilane. The inventor does not wish to be held to such a theory but it is believed that when the mixture is heated, usually in the absence of solvent and in an essentially anhydrous atmosphere, the reactions:

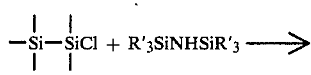

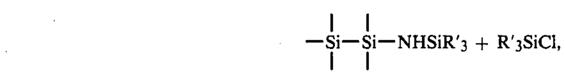

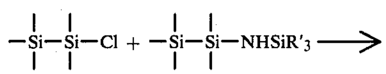

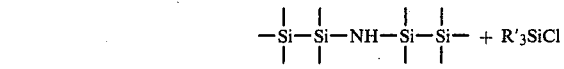

and

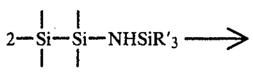

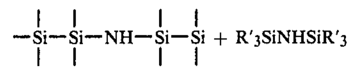

take place.

The advantage of this process is the ability to stop the reaction at any point by cooling the reaction mass thus giving polymers with any desirable viscosity, hence any desirable molecular weight. The silazane polymers range in physical appearance from liquids, to high viscosity liquids, to hard glassy materials. The materials are therefore very easy to handle. They are essentially hydrolytically stable.

Thus, this invention consists of a process for preparing an $R'_3SiNH$— containing silazane polymer which consists of contacting and reacting in an inert, essentially anhydrous, atmosphere, a chlorine-containing disilane or a mixture of chlorine-containing disilanes, of the general formula $(Cl_aR_bSi)_2$ with a disilazane having the general formula $(R'_3Si)_2NH$ at a temperature in the range of 25° C. to 300° C. while distilling by-produced volatile products, wherein R is vinyl, an alkyl group of 1–3 carbon atoms or the phenyl group; R' is vinyl, hydrogen, an alkyl group of 1–3 carbon atoms or the phenyl group; a has a value of 0.5–3; b has a value of 0–2.5 and the sum of a+b is equal to three.

This invention also deals with a new and novel composition of matter which is an $R'_3SiNH$— containing silazane polymer which is prepared by contacting and reacting in an inert, essentially anhydrous, atmosphere, a chlorine-containing disilane or a mixture of chlorine-containing disilanes, of the general formula $(Cl_aR_bSi)_2$ with a disilazane having the general formula $(R'_3Si)_2NH$ at a temperature in the range of 25° C. to 300° C. while distilling by-produced volatile products, wherein R is vinyl, an alkyl group of 1–3 carbon atoms or the phenyl group; R' is vinyl, hydrogen, an alkyl group of 1–3 carbon atoms or the phenyl group; a has a value of 0.5–3; b has a value of 0–2.5 and the sum of a+b is equal to three.

This invention further deals with a process for preparing an $R'_3SiNH$— containing silazane polymer which consists of contacting and reacting in an inert, essentially anhydrous, atmosphere, a chlorine-containing disilane or a mixture of chlorine-containing disilanes, wherein the number of diorgano-substituted silicon atoms does not exceed the number of monoorgano-substituted silicon atoms, of the general formula $(Cl_aR_bSi)_2$ with a disilazane having the general formula $(R'_3Si)_2NH$ at a temperature in the range of 25° C. to 300° C. while distilling by-produced volatile products wherein R is vinyl, an alkyl group of 1–3 carbon atoms or the phenyl group; R' is vinyl, hydrogen, an alkyl group of 1–3 carbon atoms or the phenyl group; a has a value of 0.5–3; b has a value of 0–2.5 and the sum of a+b is equal to three.

This invention also deals with a new and novel composition of matter which is an $R'_3SiNH$— containing silazane polymer which is prepared by contacting and reacting in an inert, essentially anhydrous, atmosphere, a chlorine-containing disilane or a mixture of chlorine-containing disilanes wherein the number of diorgano-substituted silicon atoms does not exceed the number of monoorgano-substituted silicon atoms of the general formula $(Cl_aR_bSi)_2$ with a disilazane having the general formula $(R'_3Si)_2NH$ at a temperature in the range of 125° C. to 300° C. while distilling by-produced volatile products, wherein R is vinyl, an alkyl group of 1–3 carbon atoms or the phenyl group; R' is vinyl, hydrogen, an alkyl group of 1–3 carbon atoms or the phenyl group; a has a value of 0.5–3; b has a value of 0–2.5 and the sum of a+b is equal to three.

Still further, this invention deals with a method of preparing a silicon carbide containing ceramic material which consists of heating a silazane polymer in an inert atmosphere or in a vacuum to at least a temperature of 750° C. until the silazane polymer is converted to silicon carbide ceramic material, which silazane polymer is obtained by a process which consists of contacting and reacting in an inert, essentially anhydrous, atmosphere, a chlorine-containing disilane or a mixture of chlorine-containing disilanes, wherein the number of diorgano-substituted silicon atoms does not exceed the number of monoorgano-substituted silicon atoms, of the general formula $(Cl_aR_bSi)_2$ with a disilazane having the general formula $(R'_3Si)_2NH$ at a temperaure in the range of 125° C. to 300° C. while distilling by-produced volatile products, wherein R is vinyl, an alkyl group of 1–3 carbon atoms or the phenyl group; R' is vinyl, hydrogen, an alkyl group of 1–3 carbon atoms or the phenyl group; a has a value of 0.5–3; b has a value of 0–2.5 and the sum of a+b is equal to three.

Yet another object of this invention is a method of preparing a silicon carbide containing ceramic article which consists of (A) forming an article of the desired shape from a silazane polymer; (B) heating the article formed in (A) in an inert atmosphere or in a vacuum to an elevated temperature of at least 750° C. until the silazane polymer is converted to silicon carbide containing ceramic, which silazane polymer is obtained by a process which consists of contacting and reacting in an inert, essentially anhydrous, atmosphere, a chlorine-containing disilane or a mixture of chlorine-containing disilanes, wherein the number of diorgano-substituted silicon atoms does not exceed the number of monoorgano-substituted silicon atoms, of the general formula $(Cl_aR_bSi)_2$ with a disilazane having the general formula $(R'_3Si)_2NH$ at a temperature in the range of 125° C. to 300° C. while distilling by-produced volatile products, wherein R is vinyl, an alkyl group of 1–3 carbon atoms or the phenyl group; R' is vinyl, hydrogen, an alkyl group of 1–3 carbon atoms or the phenyl group; a has a value of 0.5–3; b has a value of 0–2.5 and the sum of a+b is equal to three.

Still another object of this invention is a method for preparing a filled ceramic article which consists of (A) mixing a silazane polymer with at least one conventional ceramic filler, (B) forming an article of the desired shape from the mixture of silazane polymer and filler and (C) heating the article formed in (B) in an inert atmosphere or in a vacuum to an elevated temperature of at least 750° C. until the silazane polymer is converted to a silicon carbide containing ceramic, which silazane polymer is obtained by a process which consists of contacting and reacting in an inert, essentially anhydrous, atmosphere, a chlorine-containing disilane or a mixture of chlorine-containing disilanes, wherein the number of diorgano-substituted silicon atoms does not exceed the number of monoorgano-substituted silicon atoms, of the general formula $$(Cl_aR_bSi)_2$$

with a disilazane having the general formula $$(R'_3Si)_2NH$$

at a temperature in the range of 125° C. to 300° C. while distilling by-produced volatile products wherein R is vinyl, an alkyl group of 1-3 carbon atoms or the phenyl group; R' is vinyl, hydrogen, an alkyl group of 1-3 carbon atoms or the phenyl group; a has a value of 0.5-3; b has a value of 0-2.5 and the sum of a+b is equal to three.

Still further, it is an object of this invention to prepare an article coated with a silicon carbide ceramic material which method consists of (A) mixing a silazane polymer with at least one conventional ceramic filler, (B) coating a substrate with the mixture of silazane polymer and filler and, (C) heating the coated substrate in an inert atmosphere or in a vacuum to an elevated temperature of at least 750° C. until the coating is converted to a silicon carbide ceramic material, whereby a silicon carbide containing ceramic coated article is obtained, which silazane polymer is obtained by a process which consists of contacting and reacting in an inert, essentially anhydrous, atmosphere, and chlorine-containing disilane or a mixture of chlorine-containing disilanes, wherein the number of diorgano-substituted silicon atoms does not exceed the number of monoorgano-substituted silicon atoms, of the general formula $$(Cl_aR_bSi)_2$$

with a disilazane having the general formula $$(R'_3Si)_2NH$$

at a temperature in the range of 125° C. to 300° C. while distilling by-produced volatile products, wherein R is vinyl, an alkyl group of 1-3 carbon atoms or the phenyl group; R' is vinyl, hydrogen, an alkyl group of 1-3 carbon atoms or the phenyl group; a has a value of 0.5-3; b has a value of 0-2.5 and the sum of a+b is equal to three.

A further object of this invention is a process for preparing an article coated with a silicon carbide ceramic material which consists of (A) coating a substrate with a silazane polymer, (B) heating the coated substrate in an inert atmosphere or in a vacuum to an elevated temperature of at least 750° C. until the coating is converted to a silicon carbide ceramic material, whereby a silicon carbide containing ceramic coated article is obtained, which silazane polymer is obtained by a process which consists of contacting and reacting in an inert, essentially anhydrous, atmosphere, a chlorine-containing disilane or a mixture of chlorine-containing disilanes, wherein the number of diorgano-substituted silicon atoms does not exceed the number of monoorgano-substituted silicon atoms, of the general formula $$(Cl_aR_bSi)_2$$

with a disilazane having the general formula $$(R'_3Si)_2NH$$

at a temperature in the range of 125° C. to 300° C. while distilling by-produced volatile products wherein R is vinyl, an alkyl group of 1-3 carbon atoms or the phenyl group; R' is vinyl, hydrogen, an alkyl group of 1-3 carbon atoms or the phenyl group; a has a value of 0.5-3; b has a value of 0-2.5 and the sum of a+b is equal to three.

A final object of this invention is a process for preparing an $R'_3SiNH$— containing silazane polymer which consists of contacting and reacting in an inert, essentially anhydrous atmosphere, a disilazane having the general formula $$(R'_3Si)_2NH$$

with (i) a mixture of a chlorine-containing disilane having the general formula $$(Cl_aR_bSi)_2$$

and a chlorine-containing monosilane having the general formula $$R'_nSiCl_{4-n};$$

(ii) a mixture of chlorine-containing disilanes having the general formula $$(Cl_aR_bSi)_2$$

mixed with a chlorine-containing monosilane having the general formula $$R'_nSiCl_{4-n}$$

or (iii) a mixture of chlorine-containing disilanes having the general formula $$(Cl_aR_bSi)_2$$

mixed with a mixture of chlorine-containing monosilanes having the general formula $$R'_nSiCl_{4-n}$$

at a temperature in the range of 25° C. to 300° C. while distilling by-produced volatile products, wherein R is vinyl, an alkyl radical of 1-3 carbon atoms or the phenyl group; R' is vinyl, hydrogen, an alkyl group of 1-3 carbon atoms or the phenyl group; a has a value of 0.5-3; b has a value of 0-2.5; n has a value of 0, 1, 2 or 3 and the sum of a+b is equal to three.

The inventions described herein result in new compositions of matter which are an improvement in the art, in that, essentially hydrolytically stable, easy to handle silazane polymers can be prepared. Further, the silazane polymers lead to an improvement in the art of formation of silicon carbide and they can be used as binders in ceramic materials.

The invention results from reacting disilazanes with chlorine-containing disilanes or mixtures of disilanes with monosilanes in an inert, essentially anhydrous atmosphere and then firing the resulting silazane polymer to get silicon carbide or silicon carbide containing ceramic materials.

The chlorine-containing disilanes of this invention are those disilanes having the general formula $$(Cl_aR_bSi)_2.$$

In this formula, R is vinyl, an alkyl radical containing 1–3 carbon atoms or the phenyl group. Thus, those groups which are contemplated as being useful in this invention are methyl, ethyl, propyl, vinyl and phenyl. For purposes of this invention, the R groups can all be the same or they can be different. The chlorine-containing disilanes can be those found in the residue from the Direct Process for producing halosilanes (Eaborn, C., "Organosilicon Compounds", Butterworth Scientific Publications, London, 1960, pg. 1). Whenever the symbols $\phi$, Me, Et and Vi are used herein, their meaning is phenyl, methyl, ethyl and vinyl, respectively.

For purposes of this invention, the value of a and b is from 0.5–3 and 0–2.5 respectively and the sum of a+b is equal to three. Exampls of chlorine-containing disilanes useful in this invention are $\{Cl(CH_3)_2Si\}_2$, $\{Cl_2CH_3Si\}_2$, $\{Cl_2C_2H_5Si\}_2$, $\{Cl(C_6H_5)_2Si\}_2$ and $\{Cl_2CH_2{=}CHSi\}_2$.

Monosilanes useful in admixture with the disilanes of this invention can be for example $CH_3SiCl_3$, $(CH_3)_2SiCl_2$, $H(CH_3)_2SiCl$, $(CH_3)_3SiCl$, $(CH_2{=}CH)(CH_3)_2SiCl$, $(C_2H_5)_2SiCl_2$, $C_6H_5SiCl_3(C_6H_5)_2SiCl_2$ and $(C_6H_5)_3SiCl$.

Also considered within the scope of this invention is the use of mixtures of chlorine-containing disilanes. One aspect of this invention requires that whenever certain chlorine-containing disilane mixtures are required, the number of units of diorgano-substituted silicon atoms should not exceed the number of units of monoorgano-substituted silicon atoms. Even though silazane polymers can be formed from chlorine-containing disilane mixtures wherein the number of diorgano-substituted units does exceed the number of monoorgano-substituted units, it has been found that these polymers do not have the handling properties for formability because of low viscosities.

The second reactant in this invention is a disilazane of the general formula $(R'_3Si)_2NH$. For purposes of this invention, R' is vinyl, hydrogen or has the same meaning as R above. Thus, R' in this formula is vinyl, hydrogen or an alkyl radical of 1–3 carbon atoms or the phenyl group. Therefore, R', for purposes of this formula is represented by hydrogen, methyl, ethyl, propyl, vinyl and phenyl. As set forth above, each R' group in this formula can be the same or they can be different. Examples of compounds contemplated within the scope of this invention include: $\{(CH_3)_3Si\}_2NH$, $\{C_6H_5(CH_3)_2Si\}_2$, $\{(C_6H_5)_2CH_3Si\}_2NH$, $\{CH_2{=}CH(CH_3)_2Si\}_2NH$, $\{CH_2{=}CH(CH_3)C_6H_5Si\}_2NH$, $\{(CH_2{=}CH)(C_6H_5)_2Si\}_2NH$, $\{CH_2{=}CH(C_2H_5)_2Si\}_2NH$, $\{(CH_2{=}CH)C_6H_5(C_2H_5)Si\}_2NH$, $\{H(CH_3)_2Si\}_2NH$, $\{H_2(CH_3)Si\}_2NH$ and $\{HC_6H_5CH_3Si\}_2NH$.

These reactants are brought together in an inert, essentially anhydrous atmosphere. For purposes of this invention what we mean by "inert" is that the reaction is carried out under a blanket of inert gas, such as, argon or nitrogen or helium. What we mean by "essentially anhydrous" is that the reaction is preferably carried out in an absolutely anhydrous atmosphere but minute amounts of moisture can be tolerated.

When the reactants are contacted with each other, the reaction begins which forms an intermediate disilane amino compound i.e.

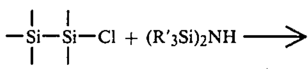

$$-\overset{|}{\underset{|}{Si}}-\overset{|}{\underset{|}{Si}}-NHSiR'_3 + R'_3SiCl.$$

Upon heating, additional disilane amino compound is formed and upon continued heating, $R'_3SiCl$ is distilled from the reaction mixture and a disilylsilazane polymer is formed i.e.

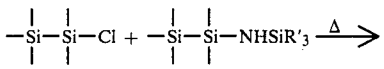

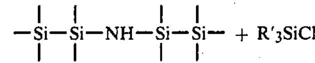

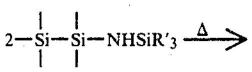

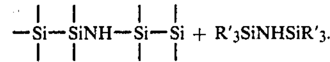

The order of addition of the materials does not appear to be critical. As the temperature is raised higher, more condensation takes place and crosslinking occurs, with residual $R'_3Si$— that is not distilled from the mixture, acting as a chain-stopper. This control allows one to stop the reaction at any point to obtain almost any desired viscosity. The desirable temperature range for this reaction is 25° C. to 300° C. The most preferred range is 125° C. to 300° C. The length of time that the reaction requires depends on the temperature and the viscosity one wishes to achieve.

What is meant by "volatile products" are the distillable by-produced products that are formed by the reactions set forth above. These materials can be represented by $(CH_3)_3SiCl$, $(CH_2{=}CH)(C_6H_5)_2SiCl$, $CH_3(C_6H_5)_2SiCl$, $(CH_3)_2C_6H_5SiCl$, $H(CH_3)_2SiCl$ and $(CH_2{=}CH)(CH_3)_2SiCl$. Sometimes, these materials require the use of a vacuum along with the heat in order to remove them from the reaction mixture.

The silazane polymers are then essentially ready to use. The silazane polymers are pyrolyzed in an inert atmosphere or in a vacuum at temperatures of at least 750° C. to give a silicon carbide containing material. If the polymer is of sufficient viscosity, it can be shaped first (such as an extruded fiber) and then pyrolyzed to give a silicon carbide containing fiber or the silazane polymers can be filled with ceramic type fillers (if desired) and then fired to at least 750° C. to obtain silicon carbide ceramic materials or silicon carbide ceramic material containing ceramic articles.

When mixtures of chlorine-containing disilanes are to be used, it is best if the chlorine-containing disilanes are mixed prior to contacting and reacting with the disilazanes.

As mentioned above, some of the resulting polymers can be extruded to give various shapes such as fibers. It has been found that the polymers of this invention that have the handleability that enables one to extrude or form them are those polymers in which the number of diorgano-substituted silicon atoms do not exceed the number of monoorgano-substituted silicon atoms. Thus, if the polymer is to be extruded or otherwise formed, it should be prepared from disilanes and disilazanes wherein the diorgano-substituted silicon atoms do not exceed the number of monoorgano-substituted silicon atoms.

As mentioned above, the polymers of this invention can be used in both the filled and unfilled state, depending on the application. Thus, it is contemplated within the scope of this invention to coat substrates with filled and unfilled polymers and heat the substrates to produce silicon carbide containing ceramic coated articles. Fillers and adjuvants can be milled on 3 roll mills by simply mixing the polymers of this invention with the fillers and making several passes on the mill. In the alternative, the polymers can be placed in solvents and the fillers and adjuvants can be added thereto and after mixing the solvent can be removed to give the filled polymer.

The coating can be carried out by conventional means. The means used depends on the polymer and substrates used and the application one has in mind. Thus, these materials can be brushed, rolled, dipped or sprayed. In the filled stated, it is sometimes necessary to trowel the polymer onto the substrate.

Whenever the polymers are converted to the ceramic state, it is done by pyrolyzing the polymer to a temperature of at least 750° C. in an inert atmosphere or in a vacuum.

Attempts to pyrolyze at or above 750° C. without an inert atmosphere lead to undesirable side reactions and therefore, caution should be exercised to be sure to exclude moisture and other potential reactants.

Now so that those skilled in the art can better appreciate and understand the invention, the following examples are given. The examples are for purposes of illustration only and are not to be regarded as limitations.

In the following examples, the analytical methods used were as follows:

Thermogravimetric analyses (TGA) were carried out on a Netzsch STA 429 (2400° C.) TGA instrument manufactured by Netzsch Instruments, Selb, West Germany. Sample sizes averaged 11 mg., program rate was 10° C./min., gas flow rate was 200 cc/min. The scale setting was 50° C./in. ±0.5° C./in.

Differential Thermal Analyses (DTA) were carried out on the Netzsch instrument using samples averaging 13.5 mg., a flow rate of 200 cc/min., a program rate of 10° C./min and a scale setting of 50° C./in ±0.5° C./in.

Percent Silicon was determined by a fusion technique which consisted of converting the silicon material to soluble forms of silicon and the soluble material is quantitatively determined as total silicon by atomic absorption spectrometry. Solubilization takes place by weighing the sample into a Parr-type fusion cup (about 0.3 gm), adding 15.0 gms of Na peroxide, heating for about 90 sec. and quenching in cold water. The material is placed in a nickel beaker containing 150–200 ml. of distilled water. 55 ml. of reagent grade acetic acid is added and diluted with water to 500 ml. volume.

Percent Chlorine (residual) was determined by Na peroxide decomposition and titration with silver nitrate. Fusion of the halides with Na peroxide is followed by potentiometric titration with standard silver nitrate by weighing a sample into a gelation capsule, placing about 1.5 gm. of $Na_2O_2$, about 0.7 gm of $KNO_3$ and about 0.15 gm of sugar into a clean, dry reaction cup and burying the capsule in the mixture. The cup is filled with $Na_2O_2$ and placed in a reaction vessel. It is heated for 1-1 ½ min. and quenched in cold water. The cup and vessel are washed and the washings are collected. The washings are heated to dissolve any solids. 15 ml. of cold 50% aqueous $H_2SO_4$ is added and allowed to stand 15–20 sec. This solution is neutralized with additional $H_2SO_4$ and tritrated.

Carbon and hydrogen were determined by microcombustion by weighing 10 to 20 mg. of sample into a micro platinum boat and treating it in an A. H. Thomas combustion apparatus, Catalog No. 6447-E, Philadelphia, PA.

In the reactions carried out below, the reaction apparatus was essentially the same in each case and consisted of a 500 ml., glass, round-bottomed flask equipped with a mechanical stirrer, gas inlet tube, distillation apparatus and a thermocouple to record temperature. The distillation apparatus was equipped to use a vacuum if needed.

EXAMPLE 1

A mixture of 50 gms of chlorine-containing disilanes consisting of 57.6 weight percent of tetrachlorodimethyldisilane; 32 weight percent of trichlorotrimethyldisilane and 10.4 weight percent of dichlorotetramethyldisilane were added dropwise to a reaction vessel described above which contained 120 gms of hexamethyldisilazane. The reaction vessel was then slowly heated to 275° C. under argon and held at that temperature for two hours. The distillate that was collected during the heating period was found to contain $(CH_3)_3SiCl$, some hexamethyldisilazane and a small amount of $NH_4Cl$. The polymer residue in the flask weighed 29.6 gms and when cooled was a hard, colorless, glassy solid. The material was fired in an Astro Industries Furnace 1000A water cooled graphite heated model 1000.3060-FP-12 to 1200° C. under Argon for a yield of 46.29%. The material contained 29% carbon, 7–8% hydrogen, 45% silicon and 8.1% nitrogen. Infra red analysis showed the presence of —Si—NH—Si— but no —Si—O—Si—. X-ray analysis of samples fired at various temperatures showed the following:

| temp | type of material |
|---|---|
| 1200° C. | Amorphous material |
| 1400° C. | Amorphous material |
| 1600° C. | beta-SiC 120Å and Moissanite SiC |

-continued

| temp | type of material |
|---|---|
| 1800° C. | beta-SiC of > 2000Å and Moissanite SiC |
| 2000° C. | beta-SiC of > 2000Å but no Moissanite |

Ebulliometry gave 3125 gm/mole.

EXAMPLE 2

Hexamethyldisilazane (214 gms) and 59.90 gms of $Si_2Cl_6$ were placed in a reaction vessel described above. Upon mixing, the reaction exothermed to 57° C. and the mixture turned cloudy white. Distillation begin at about 77° C. and the reaction mass cleared and turned a faint yellow color when the flask reached 110° C.

The reaction mass proceeded to foam and the foam level was controlled by increasing stirrer speed and maintaining the temperature at 160°-165° C. for 1 hour. The temperature was raised to 170° C. with rapid stirring and then to 265° C. where the reaction mass foamed excessively. The temperature was descreased to about 215° C. for a short while and then the pot was allowed to cool. When cooled, the material was a glassy, clear solid which was easily removed from the inside surface of the reaction flask. A small amount of gummy liquid was also removed from the flask. Infra red analysis showed the presence of NH and $Si(CH_3)_3$ with some $—SiCH_3$ and —Si—N—Si. %Si was 42.3%. X-ray diffraction on a sample fired to 1600° C. showed the major phase to be beta-silicon carbide with a minor phase of beta-$Si_3N_4$. The average crystallite size of the beta-silicon carbide was 130 Å.

EXAMPLE 3

Tetrachlorodimethyldisilane (32.7 gms) and 17.8 gms of trichlorotrimethyldisilane were mixed with 168.3 gms of hexamethyldisilazane in a reaction vessel equipped as described above. This mixture was gradually heated to 265° C. under argon and held there for about 10 min. Distillate was removed during this period of time. When cooled, the residue was a polymer which was a hard, colorless resin. The yield was 65.7%. Thermal gravimetric analysis to 1000° C. yielded 54% silicon carbide. Differential thermal analysis in air to 500° C. gave an exotherm at 93° C. DTA in argon to 500° C. showed no thermal break. Residual chlorine content was 1.44 weight % and %Si was 47.4. Infra-red analysis showed the presence of NH, $NH_4Cl$, $SiCH_3$, Si—N—Si. X-ray diffraction studies on a sample fired at 1600° C. showed beta-silicon carbide having a particle size of 120 Å and a small amount of alpha-silicon carbide. The polymer was analyzed by derivatization gas chromatography and found to contain 7.5 weight % $(CH_3)_3Si—$, 15.0 weight % $(CH_3)_2Si=$ and 68.5 weight 5 of $CH_3Si\equiv$. Derivatization gas chromatography is an analysis wherein the polymer is treated with tetraethoxysilane and KOH to give the organoethoxysilane derivatives of the individual polymeric units. Gas chromatography is then used to determine the content and relative ratios of the various units present in the mixture. This procedure is carried out by weighing about 0.3 gm of the polymer sample into a 50 ml. round-bottomed flask. To this flask is added 8.0 ml. of $Si(OC_2H_5)_4$. One pellet of KOH is added and the flask is heated to initiate the reaction and it is then refluxed for 45 min. to one hour. An additional 2.0 ml. of $Si(OC_2H_5)_4$ is added and then about ½ teaspoon of pulverized $CO_2$ is added to neutralize the KOH. The sample is centrifuged to separate the phases. The silane layer is then analyzed by gas chromatography which has been standardized.

EXAMPLE 4

Tetrachlorodimethyldisilane (45.6 gms) was mixed with 129.1 gms of hexamethyldisilazane under argon. The reaction vessel was equipped as in Example 1. This reaction mass was heated to 240° C. and held for a few minutes and then cooled to room temperature. The resulting material was a solid white powder and 26.6 gms were obtained. The % yield was 58.3%. TGA to 1000° C. in argon gave 27% weight loss. DTA in air to 500° C. gave an exotherm at 140° C. and DTA in argon to 500° C. gave no thermal break. % residual chlorine was 4.83 weight % and weight % Si was 44.4. Infra-red analysis showed the presence of $NH_4Cl$, Si—N—Si and $—SiCH_3$. A yield of 62.6 weight % was obtained when the material was fired to 1200° C. and 78.1 weight % was obtained on firing from 1200° C. up to 1600° C. Derivatization using $Si(OC_2H_5)_4$ gave the following: 6.4 weight % $(CH_3)_3Si—$, 2.0% of $(CH_3)_2Si=$ and 68.0% of $CH_3Si\equiv$.

EXAMPLE 5

Trichlorotrimethyldisilane (45.8 gms) was mixed with 196.84 gms of hexamethyldisilazane in a reaction flask equipped as described above. This mixture was heated under argon to 280° C. The material was maintained at this temperature for a few minutes and then cooled to room temperature. The polymer obtained was 33.4 gms of a gummy, white solid in a yield of 72.9 weight %. A TGA in argon to 1000° C. gave 87.5% weight loss. DTA in air to 500° C. gave an exotherm at 95° C. and a DTA in argon to 500° C. showed an endotherm from room temperature to 140° C. The residual chlorine was 2.29 weight %. %Si was 45.2. Infra-red analysis showed the presence of —NH, $NH_4Cl$, $SiCH_3$, Si—N—Si and a small amount of Si—O—Si. Astro firing gave a 90.2% weight loss at 1200° C. and 16.2% weight loss on firing from 1200°-1600° C. X-ray diffraction studies on the 1600° C. fired sample showed beta-silicon carbide of 120 Å particle size plus a small amount of alpha-silicon carbide. Derivatization analysis showed 4.0% $(CH_3)_3Si—$, 31.0% $(CH_3)_2Si=$ and 32% $CH_3Si\equiv$.

EXAMPLE 6

A mixture of 25 mole % tetrachlorodimethyldisilane and 75 mole % tetramethyldichlorodisilane totaling 55.3 gms was mixed with 113.0 gms of hexamethyldisilazane under argon and heated to 275° C. in a reaction vessel equipped as described above. The temperature was held for ½ hour and then the reaction mass was allowed to cool. Thirty-one and seven tenths grams of a clear yellow liquid were obtained for a yield of 57.3% of the ceramic material. TGA in argon to 1000° C. gave a 7.0% yield. DTA in air to 500° C. gave an exotherm at 90° C. and a DTA in argon at 500° C. showed no thermal break. % residual chlorine was 3.06% and the %Si was 43.0. Firing in the Astro furnace at 1200° C. gave a 7.6 weight % yield of the ceramic material and firing at 1200°-1600° C. gave a 75.8 weight % yield. Gas chromatography of the material from derivatization gave 3.5% of $(CH_3)_3Si$, 44.1% $(CH_3)_2Si=$ and 25.4% of $CH_3Si\equiv$.

EXAMPLE 7

Tetramethyldichlorodisilane (56.3 gms) was mixed with 113.3 gms of hexamethyldisilazane under argon and heated over 1½ hours to 250° C. and held there for 1 hour. The reaction vessel was equipped as described above. The bulk of the material distilled from the reaction vessel leaving only 16.1 gms of a light yellow oil which turned colorless on cooling. The % yield of ceramic material was 28.6. TGA to 1000° C. in argon gave 0% yield of ceramic material. DTA in air to 500° C. gave an exotherm at 85° C. and DTA in argon to 500° C. gave an endotherm from room temperature to 200° C. The % residual chlorine was 7.47% and % Si was 39. Infra-red showed the presence of NH, SiCl and $Si(CH_3)_3$. The inventor was unable to fire this material in the Astro furnace because of its high volatility. Derivatization gas chromatography showed 5.6% $(CH_3)_3Si$—, 68% $(CH_3)_2Si$= and 9.0% $CH_3Si$≡.

EXAMPLE 8

A polymer was prepared from a disilane mixture similar in composition to that set forth in Example 1. The material was heated under argon for 1 hour. This material was made into a filled, molded ceramic material by combining 35.02 gms of 320 mesh silicon carbide powder and 15.06 gms of the above polymer in a toluene solution. The material was then vacuum evaporated to dryness and then ball milled to give a fine powder. The powder was then press molded at 200° C. at 7500 psi for 30 minutes to make a pellet which was glassy and very smooth. The resulting pellet was fired in the Astro furnace described above at 1200° C. for 6 hours to a ceramic material with very low porosity. The yield was about 85%.

EXAMPLE 9

The polymer from Example 8 was mixed in a ratio of 10 weight % with 90 weight % of 500 mesh Norton crystolon B powdered silicon carbide. The mixture was prepared in hexane and then vacuum evaporated to dryness and ball milled for 45 min. to give a fine powder. Six grams of the powder was subjected to the following conditions to prepare each pellet.

| | Pellet Preparation | | |
|---|---|---|---|
| Sample | Pressed at a temp. of °C. | Pressure (psi) | Time (min) |
| A | 175 | 8,000 | 12 |
| B | 250 | 8,000 | 10 |
| C | 250 | 10,000 | 10 |
| D | 175 | 10,000 | 10 |
| E | 300 | 8,000 | 10 |
| F | 250 | 8,000 | 30 |
| G | 250 | 10,000 | 30 |

All of the samples formed nice, even pellets except Sample E which delaminated. When fired in the Astro furnace these materials give ceramic pellets.

EXAMPLE 10

The polymer of Example 1 was mixed in a 40/60 weight ratio with 320 mesh Norton Crystolon beta-silicon carbide powder using a solution-evaporation-grinding technique. Thus, 20.64 gms of polymer was dissolved in 80 ml of hexane to which was added 30.25 gms of 320 mesh silicon carbide. It was then evaporated to dryness to give a soft material which was ground to a powder using a mortar and pestle rather than the ball mill. The fine powder was then molded in a pellet mold at 175° C. under 7500 psi for 30 minutes. The resulting pellet was a smooth, very nice pellet. When heated in the Astro furnace, this material gave a ceramic material.

EXAMPLE 11

Preparation of a polymer from a mixture of disilanes and a monosilane

A disilane mixture similar in composition to that found in Example 1 (42.0 gms) and 41.6 gms of $CH_3SiCl_3$ were mixed in a 500 ml., 3-necked, round-bottomed glass flask equipped as in Example 1. Hexamethyldisilazane (237 gms) was added under an argon blanket with stirring. After stirring about 10 minutes at room temperature, the reaction mixture was heated over 1 hour, 15 minutes to 275° C. and held there for about 30 minutes. The reaction mixture turned cloudy at about 95–100%°C. but cleared again at 135° C. After cooling to room temperature, there resulted a pale yellow, clear, hard, glassy resin.

This material was fired in the furnace in a graphite crucible to 1200° C. over a 2½ hour period. The ceramic resulting from this firing was obtained in 53 weight % yields. It was a low density foam-like ceramic.

EXAMPLE 12

Preparation of an article coated with a filled ceramic

A polymer prepared similar to Example 1 was mixed with Norton 1000 mesh beta-silicon carbide in a weight ratio of 10 gms to 10 gms. This material was then mixed with 100 gms of dry hexane. This slurry was evaporated under vacuum until a paint-like viscosity of the slurry was obtained. A graphite disc was dip coated with the slurry and allowed to air dry. It was then heated in air at 125° C. for 30 minutes and at 150° C. for 30 minutes to dry the coating. The coated disc was then heated to 1200° C. in an inert atmosphere over a 2½ hour period and then allowed to cool. The filled ceramic coating had remained intact during the pyrolysis, showing large areas of a smooth, uniform continuous coating. In the areas where the coating was thicker, it was pockmarked.

EXAMPLE 13

Ceramic fibers from a silazane polymer

A polymer was prepared similar to that found in Example 1. This material, a clear solid hard resin, was melted and extruded into fibers using conventional fiber extruding equipment. The fibers were then fired in the furnace under argon to 1200° C. after being treated as follows:

| Sample | treatment | result |
|---|---|---|
| A | none | — |
| B | heat at 200° C. 1 hour | solid clear fiber |
| C | 15 min. dist. $H_2O$ at 75° C. then heat 1 hr. at 200° C. | clear fiber turned opaque-soft |
| D | 15 min in 0.1 N HCl at 75° C. | dissolved in acid |
| E | 15 min. in dist. $H_2O$ at 25° C. then 1 hour at 200° C. | clear fiber turned opaque-soft |
| F | 15 min. at 100° C. heat 100% humidity | — |

All samples were given mild heat treatment for 18 hours, then fired.

| Sample | After 1200° C. firing result |
|---|---|
| A | Fibers retained shape/good quality |
| B | Fibers retained shape/excellent quality |
| C | Fibers retained shape/poor quality |
| D | — |
| E | Fibers retained shape/poor quality |
| F | Fibers retained shape/good quality |

EXAMPLE 14

A polymer similar to that found in Example 1 was prepared and melt extruded into small diameter fibers of about 12μ. These straight fibers were placed on a 6"×4" piece of graphite which had been previously baked out at 1500° C. for three hours in vacuo and the graphite was rolled up in such a manner that the fibers were maintained straight and held snugly in place. This roll was then placed in a graphite crucible and fired to 1200° C. under argon to give hard, dark colored fibers.

When the polymer was extruded into small diameter fibers and heat treated in air prior to firing at 1200° C. according to the schedule below, the resulting fibers were soft and pliable.

| Schedule |
|---|
| 1 hr/75° C. |
| 0.5 hr/125° C. |
| 0.5 hr/150° C. |
| 1.0 hr/175° C. |
| 1.0 hr/200° C. |
| 1.0 hr/225° C. |
| 1.0 hr/250° C. |
| 0.33 hr/275° C. |

EXAMPLE 15

The polymer of Example 1 was mixed in a 30/70 weight ratio with 320 mesh Norton Crystolon beta-silicon carbide using the solution-evaporation-ball mill technique. The material was then press molded at 10,000 psi and 175° C. for 30 min. to give a very smooth glassy surfaced pellet. This pellet was fired to 1200° C. over a 6 hour period to give a ceramic pellet with a binder char yield of 50%.

That which is claimed is:

1. A process for preparing an $R'_3SiNH$—containing silazane polymer which consists of contacting and reacting in an inert, essentially anhydrous, atmosphere, a chlorine-containing disilane or a mixture of chlorine-containing disilanes, of the general formula $$(Cl_aR_bSi)_2$$

with a disilazane having the general formula $$(R'_3Si)_2NH$$

at a temperature in the range of 25° C. to 300° C. while distilling by-produced volatile products, wherein R is vinyl, an alkyl group of 1-3 carbon atoms or the phenyl group;

R' is vinyl, hydrogen, an alkyl group of 1-3 carbon atoms or the phenyl group;

a has a value of 0.5-3;

b has a value of 0-2.5 and the sum of a+b is equal to three.

2. A process as claimed in claim 1 wherein the chlorine-containing disilane is $\{Cl(CH_3)_2Si\}_2$ and the disilazane is $\{(CH_3)_3Si\}_2NH$.

3. A process as claimed in claim 1 wherein the chlorine-containing disilane is $\{Cl(CH_3)_2Si\}_2$ and the disilazane is $\{(CH_3)_2CH_2{=}CHSi\}_2NH$.

4. A process as claimed in claim 1 wherein the chlorine-containing disilane is $\{Cl(CH_3)_2Si\}_2$ and the disilazane is $\{CH_3(C_6H_5)_2Si\}_2NH$.

5. A process as claimed in claim 1 wherein the chlorine-containing disilane is $\{Cl(CH_3)_2Si\}_2$ and the disilazane is $\{(C_6H_5)(CH_3)_2Si\}_2NH$.

6. A process as claimed in claim 1 wherein the chlorine-containing disilane is $\{Cl(CH_3)_2Si\}_2$ and the disilazane is $\{H(CH_3)_2Si\}_2NH$.

7. A process as claimed in claim 1 wherein the chlorine-containing disilane is $\{Cl_2CH_3Si\}_2$ and the disilazane is $\{(CH_3)_3Si\}_2NH$.

8. A process as claimed in claim 1 wherein the chlorine-containing disilane is $\{Cl_2CH_3Si\}_2$ and the disilazane is $\{(CH_3)_2CH_2{=}CHSi\}_2NH$.

9. A process as claimed in claim 1 wherein the chlorine-containing disilane is $\{Cl_2CH_3Si\}_2$ and the disilazane is $\{CH_3(C_6H_5)_2Si\}_2NH$.

10. A process as claimed in claim 1 wherein the chlorine-containing disilane is $\{Cl_2CH_3Si\}_2$ and the disilazane is $\{(C_6H_5)(CH_3)_2Si\}_2NH$.

11. A process as claimed in claim 1 wherein the chlorine-containing disilane is $\{Cl_2CH_3Si\}_2$ and the disilazane is $\{H(CH_3)_2Si\}_2NH$.

12. A process as claimed in claim 1 wherein the chlorine-containing disilane is $Cl(CH_3)_2SiSiCH_3Cl_2$ and the disilazane is $\{(CH_3)_3Si\}_2NH$.

13. A process as claimed in claim 1 wherein the chlorine-containing disilane is $Cl(CH_3)_2SiSiCH_3Cl_2$ and the disilazane is $\{(CH_3)_2CH_2{=}CHSi\}_2NH$.

14. A process as claimed in claim 1 wherein the chlorine-containing disilane is $Cl(CH_3)_2SiSiCH_3Cl_2$ and the disilazane is $\{CH_3(C_6H_5)_2Si\}_2NH$.

15. A process as claimed in claim 1 wherein the chlorine-containing disilane is $Cl(CH_3)_2SiSiCH_3Cl_2$ and the disilazane is $\{(C_6H_5)(CH_3)_2Si\}_2NH$.

16. A process as claimed in claim 1 wherein the chlorine-containing disilane is $Cl(CH_3)_2SiSiCH_3Cl_2$ and the disilazane is $\{H(CH_3)_2Si\}_2NH$.

17. A process as claimed in claim 1 wherein a mixture of chlorine-containing disilanes is used and the mixture consists of $\{Cl_2CH_3Si\}_2$, $\{Cl(CH_3)_2Si\}_2$ and $Cl(CH_3)_2SiSiCH_3Cl_2$ in a mole ratio of approximately 55:12:33 and the disilazane is $\{R'_3Si\}_2NH$.

18. A process as claimed in claim 17 wherein the disilazane is $\{(CH_3)_3Si\}_2NH$.

19. A process as claimed in claim 17 wherein the disilazane is $\{(CH_3)_2CH_2{=}CHSi\}_2NH$.

20. A process as claimed in claim 17 wherein the disilazane is $\{CH_3(C_6H_5)_2Si\}_2NH$.

21. A process as claimed in claim 17 wherein the disilazane is $\{(C_6H_5)(CH_3)_2Si\}_2NH$.

22. A process as claimed in claim 17 wherein the disilazane is $\{H(CH_3)_2Si\}_2NH$.

23. A process as claimed in claim 1 wherein a mixture of chlorine-containing disilanes is used and the mixture consists of $\{Cl_2CH_3Si\}_2$ and $Cl(CH_3)_2SiSiCH_3Cl_2$ in a mole ratio of 65:35 and the disilazane is $\{R'_3Si\}_2NH$.

24. A process as claimed in claim 23 wherein the disilazane is $\{(CH_3)_3Si\}_2NH$.

25. A process as claimed in claim 23 wherein the disilazane is $\{(CH_3)_2CH_2{=}CHSi\}_2NH$.

26. A process as claimed in claim 23 wherein the disilazane is $\{CH_3(C_6H_5)_2Si\}_2NH$.

27. A process as claimed in claim 23 wherein the disilazane is $\{(C_6H_5)(CH_3)_2Si\}_2NH$.

28. A process as claimed in claim 23 wherein the disilazane is $\{H(CH_3)_2Si\}_2NH$.

29. A process as claimed in claim 1 wherein a mixture of chlorine-containing disilanes is used and the mixture consists of $\{Cl_2CH_3Si\}_2$ and $\{Cl(CH_3)_2Si\}_2$ in a mole ratio of 50:50 and the disilazane is $\{R'_3Si\}_2NH$.

30. A process as claimed in claim 29 wherein the disilazane is $\{(CH_3)_3Si\}_2NH$.

31. A process as claimed in claim 29 wherein the disilazane is $\{(CH_3)_2CH_2{=}CH\}_2NH$.

32. A process as claimed in claim 29 wherein the disilazane is $\{CH_3(C_6H_5)_2Si\}_2NH$.

33. A process as claimed in claim 29 wherein the disilazane is $\{(C_6H_5)(CH_3)_2Si\}_2NH$.

34. A process as claimed in claim 29 wherein the disilazane is $\{H(CH_3)_2Si\}_2NH$.

35. A process as claimed in claim 1 wherein a mixture of chlorine-containing disilanes is used and the mixture consists of $\{Cl_2CH_3Si\}_2$ and $\{Cl(CH_3)_2Si\}_2$ in a mole ratio of 75:25 and the disilazane is $\{R'_3Si\}_2NH$.

36. A process as claimed in claim 35 wherein the disilazane is $\{(CH_3)_3Si\}_2NH$.

37. A process as claimed in claim 35 wherein the disilazane is $\{(CH_3)_2CH_2{=}CHSi\}_2NH$.

38. A process as claimed in claim 35 wherein the disilazane is $\{CH_3(C_6H_5)_2Si\}_2NH$.

39. A process as claimed in claim 35 wherein the disilazane is $\{(C_6H_5)(CH_3)_2Si\}_2NH$.

40. A process as claimed in claim 35 wherein the disilazane is $\{H(CH_3)_2Si\}_2NH$.

41. A composition of matter which is an $R'_3SiNH$—containing silazane polymer which is prepared by contacting and reacting in an inert, essentially anhydrous, atmosphere a chlorine-containing disilane or a mixture of chlorine-containing disilanes, of the general formula

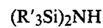

$$(Cl_aR_bSi)_2$$

with a disilazane having the general formula $$(R'_3Si)_2NH$$

at a temperature in the range of 25° C. to 300° C. while distilling by-produced volatile products, wherein R is vinyl, an alkyl group of 1–3 carbon atoms or the phenyl group;

R' is vinyl, hydrogen, an alkyl group of 1–3 carbon atoms or the phenyl group;

a has a value of 0.5–3;

b has a value of 0–2.5 and the sum of a+b is equal to three.

42. A composition as claimed in claim 41 wherein the chlorine-containing disilane is $\{Cl(CH_3)_2Si\}_2$ and the disilazane is $\{(CH_3)_3Si\}_2NH$.

43. A composition as claimed in claim 41 wherein the chlorine-containing disilane is $\{Cl(CH_3)_2Si\}_2$ and the disilazane is $\{(CH_3)_2CH_2{=}CHSi\}_2NH$.

44. A composition as claimed in claim 41 wherein the chlorine-containing disilane is $\{Cl(CH_3)_2Si\}_2$ and the disilazane is $\{CH_3(C_6H_5)_2Si\}_2NH$.

45. A composition as claimed in claim 41 wherein the chlorine-containing disilane is $\{Cl(CH_3)_2Si\}_2$ and the disilazane is $\{(C_6H_5)(CH_3)_2Si\}_2NH$.

46. A composition as claimed in claim 41 wherein the chlorine-containing disilane is $\{Cl(CH_3)_2Si\}_2$ and the disilazane is $\{H(CH_3)_2Si\}_2NH$.

47. A composition as claimed in claim 41 wherein the chlorine-containing disilane is $\{Cl_2CH_3Si\}_2$ and the disilazane is $\{(CH_3)_3Si\}_2NH$.

48. A composition as claimed in claim 41 wherein the chlorine-containing disilane is $\{Cl_2CH_3Si\}_2$ and the disilazane is $\{(CH_3)_2CH_2{=}CHSi\}_2NH$.

49. A composition as claimed in claim 41 wherein the chlorine-containing disilane is $\{Cl_2CH_3Si\}_2$ and the disilazane is $\{CH_3(C_6H_5)_2Si\}_2NH$.

50. A composition as claimed in claim 41 wherein the chlorine-containing disilane is $\{Cl_2CH_3Si\}_2$ and the disilazane is $\{(C_6H_5)(CH_3)_2Si\}_2NH$.

51. A composition as claimed in claim 41 wherein the chlorine-containing disilane is $\{Cl_2CH_3Si\}_2$ and the disilazane is $\{H(CH_3)_2Si\}_2NH$.

52. A composition as claimed in claim 41 wherein the chlorine-containing disilane is $Cl(CH_3)_2SiSiCH_3Cl_2$ and the disilazane is $\{(CH_3)_3Si\}_2NH$.

53. A composition as claimed in claim 41 wherein the chlorine-containing disilane is $Cl(CH_3)_2SiSiCH_3Cl_2$ and the disilazane is $\{(CH_3)_2CH_2{=}CHSi\}_2NH$.

54. A composition as claimed in claim 41 wherein the chlorine-containing disilane is $Cl(CH_3)_2SiSiCH_3Cl_2$ and the disilazane is $\}CH_3(C_6H_5)_2Si\}_2NH$.

55. A composition as claimed in claim 41 wherein the chlorine-containing disilane is $Cl(CH_3)_2SiSiCH_3Cl_2$ and the disilazane is $\{(C_6H_5)(CH_3)_2Si\}_2NH$.

56. A composition as claimed in claim 41 wherein the chlorine-containing disilane is $Cl(CH_3)_2SiSiCH_3Cl_2$ and the disilazane is $\{H(CH_3)_2Si\}_2NH$.

57. A composition as claimed in claim 41 wherein a mixture of chlorine-containing disilanes is used and the mixture consists of $\{Cl_2CH_3Si\}_2$, $\{Cl(CH_3)_2Si\}_2$ and $Cl(CH_3)_2SiSiCH_3Cl_2$ in a mole ratio of approximately 58:10:32 and the disilazane is $\{R'_3Si\}_2NH$.

58. A composition as claimed in claim 57 wherein the disilazane is $\{(CH_3)_3Si\}_2NH$.

59. A composition as claimed in claim 57 wherein the disilazane is $\{(CH_3)_2CH_2{=}CHSi\}_2NH$.

60. A composition as claimed in claim 57 wherein the disilazane is $\{CH_3(C_6H_5)_2Si\}_2NH$.

61. A composition as claimed in claim 57 wherein the disilazane is $\{(C_6H_5)(CH_3)_2Si\}_2NH$.

62. A composition as claimed in claim 57 wherein the disilazane is $\{H(CH_3)_2Si\}_2NH$.

63. A composition as claimed in claim 41 wherein a mixture of chlorine-containing disilanes is used and the mixture consists of $\{Cl_2CH_3Si\}_2$ and $Cl(CH_3)_2SiSiCH_3Cl_2$ in a mole ratio of 65:35 and the disilazane is $\{R'_3Si\}_2NH$.

64. A composition as claimed in claim 63 wherein the disilazane is $\{(CH_3)_3Si\}_2NH$.

65. A composition as claimed in claim 63 wherein the disilazane is $\{(CH_3)_2CH_2{=}CHSi\}_2NH$.

66. A composition as claimed in claim 63 wherein the disilazane is $\{CH_3(C_6H_5)_2Si\}_2NH$.

67. A composition as claimed in claim 63 wherein the disilazane is $\{(C_6H_5)(CH_3)_2Si\}_2NH$.

68. A composition as claimed in claim 63 wherein the disilazane is $\{H(CH_3)_2Si\}_2NH$.

69. A composition as claimed in claim 41 wherein a mixture of chlorine-containing disilanes is used and the mixture consists of $\{Cl_2CH_3Si\}_2$ and $\{Cl(CH_3)_2Si\}_2$ in a mole ratio of 50:50 and the disilazane is $\{R'_3Si\}_2NH$.

70. A composition as claimed in claim 69 wherein the disilazane is $\{(CH_3)_3Si\}_2NH$.

71. A composition as claimed in claim 69 wherein the disilazane is $\{(CH_3)_2CH_2{=}CH\}_2NH$.

72. A composition as claimed in claim 69 wherein the disilazane is $\{CH_3(C_6H_5)_2Si\}_2NH$.

73. A composition as claimed in claim 69 wherein the disilazane is $\{(C_6H_5)(CH_3)_2Si\}_2NH$.

74. A composition as claimed in claim 69 wherein the disilazane is $\{H(CH_3)_2Si\}_2NH$.

75. A composition as claimed in claim 41 wherein a mixture of chlorine-containing disilanes is used and the mixture consists of $\{Cl_2CH_3Si\}_2$ and $\{Cl(CH_3)_2Si\}_2$ in a mole ratio of 25:75 and the disilazane is $\{R'_3Si\}_2NH$.

76. A composition as claimed in claim 75 wherein the disilazane is $\{(CH_3)_3Si\}_2NH$.

77. A composition as claimed in claim 75 wherein the disilazane is $\{(CH_3)_2CH_2{=}CHSi\}_2NH$.

78. A composition as claimed in claim 75 wherein the disilazane is $\{CH_3(C_6H_5)_2Si\}_2NH$.

79. A composition as claimed in claim 75 wherein the disilazane is $\{C_6H_5(CH_3)_2Si\}_2NH$.

80. A composition as claimed in claim 75 wherein the disilazane is $\{H(CH_3)_2Si\}_2NH$.

81. A process as claimed in claim 1 for preparing an $R'_3SiNH$— containing silazane polymer which consists of contacting and reacting in an inert, essentially anhydrous, atmosphere, a chlorine-containing disilane or a mixture of chlorine-containing disilanes, wherein the number of diorgano-substituted silicon atoms does not exceed the number of monoorgano-substituted silicon atoms, of the general formula $$(Cl_aR_bSi)_2$$

with a disilazane having the general formula $$(R'_3Si)_2NH$$

at a temperature in the range of 125° C. to 300° C. while distilling by-produced volatile products, wherein

- R is vinyl, an alkyl group of 1–3 carbon atoms or the phenyl group;
- R′ is vinyl, hydrogen, an alkyl group of 1–3 carbon atoms or the phenyl group;
- a has a value of 0.5–3;
- b has a value of 0–2.5 and the sum of a+b is equal to three.

82. A composition of matter as claimed in claim 41 which is an $R'_3SiNH$— containing silazane polymer which is prepared by contacting and reacting in an inert, essentially anhydrous, atmosphere, a chlorine-containing disilane or a mixture of chlorine-containing disilanes wherein the number of diorgano-substituted silicon atoms does not exceed the number of monoorgano-substituted silicon atoms of the general formula $$(Cl_aR_bSi)_2$$

with a disilazane having the general formula $$(R'_3Si)_2NH$$

at a temperature in the range of 125° C. to 300° C. while distilling by-produced volatile products, wherein

- R is vinyl, an alkyl group of 1–3 carbon atoms or the phenyl group;
- R′ is vinyl, hydrogen, an alkyl group of 1–3 carbon atoms or the phenyl group;
- a has a value of 0.5–3;
- b has a value of 0–2.5 and the sum of a+b is equal to three.

83. A method for preparing a silicon carbide ceramic material which consists of heating an $R'_3SiNH$— containing silazane polymer in an inert atmosphere or in a vacuum to at least a temperature of 750° C. until the silazane polymer is converted to silicon carbide ceramic material, which silazane polymer is obtained by a process which consists of contacting and reacting in an inert, essentially anhydrous, atmosphere, a chlorine-containing disilazne or a mixture of chlorine-containing disilanes, wherein the number of diorgano-substituted silicon atoms does not exceed the number of monoorgano-substituted silicon atoms, of the general formula $$(Cl_aR_bSi)_2$$

with a disilazane having the general formula $$(R'_3Si)_2NH$$

at a temperature in the range of 125° C. to 300° C. while distilling by-produced volatile products, wherein

- R is vinyl, an alkyl group of 1–3 carbon atoms or the phenyl group;
- R′ is vinyl, hydrogen, an alkyl group of 1–3 carbon atoms or the phenyl group;
- a has a value of 0.5–3;
- b has a value of 0–2.5 and the sum of a+b is equal to three.

84. A method for preparing a silicon carbide containing ceramic article which consists of (A) forming an article of the desired shape from an $R'_3SiNH$— containing silazane polymer;

(B) heating the article formed in (A) in an inert atmosphere or in a vacuum to an elevated temperature of at least 750° C. until the silazane polymer is converted to silicon carbide containing ceramic, which silazane polymer is obtained by a process which consists of contacting and reacting in an inert, essentially anhydrous, atmosphere, a chlorine-containing disilane or a mixture of chlorine-containing disilanes, wherein the number of diorgano-substituted silicon atoms does not exceed the number of monoorgano-substituted silicon atoms, of the general formula $$(Cl_aR_bSi)_2$$

with a disilazane having the general formula $$(R'_3Si)_2NH$$

at a temperature in the range of 125° C. to 300° C. while distilling by-produced volatile products, wherein

- R is vinyl, an alkyl group of 1–3 carbon atoms or the phenyl group;
- R′ is vinyl, hydrogen, an alkyl group of 1–3 carbon atoms or the phenyl group;
- a has a value of 0.5–3;
- b has a value of 0–2.5 and the sum of a+b is equal to three.

85. The method of claim 84 wherein at least one conventional ceramic filler is mixed with the silazane polymer prior to forming an article of the desired shape.

86. A method for preparing an article coated with ceramic which consists of (A) coating a substrate with an $R'_3SiNH$— containing silazane polymer, (B) heating the coated substrate in an inert atmosphere or in a vacuum to an elevated temperature of at least 750° C. until the coating is converted to a silicon carbide ceramic material, whereby a silicon carbide-containing ceramic coated article is obtained, which silazane polymer is obtained by a process which consists of contacting and reacting in an inert, essentially anhydrous, atmosphere, a chlorine-containing disilane or a mixture of chlorine-containing disilanes, wherein the number of diorgano-substituted silicon atoms does not exceed the number of monoorgano-substituted silicon atoms, of the general formula $$(Cl_aR_bSi)_2$$

with a disilazane having the general formula $$(R_3Si)_2NH$$

at a temperature in the range of 125° C. to 300° C. while distilling by-produced volatile products, wherein R is vinyl, an alkyl group of 1–3 carbon atoms or the phenyl group;

R' is vinyl, hydrogen, an alkyl group of 1–3 carbon atoms or the phenyl group;

a has a value of 0.5–3;

b has a value of 0–2.5 and the sum of a+b is equal to three.

87. The method of claim 86 wherein at least one conventional ceramic filler is mixed with the silazane polymer prior to the coating of the substrate.

88. A process for preparing an $R'_3SiNH$— containing silazane polymer which consists of contacting and reacting in an inert, essentially anhydrous atmosphere, a disilazane having the general formula $$(R'_3Si)_2NH$$

with (i) a mixture of a chlorine-containing disilane having the general formula $$(Cl_aR_bSi)_2$$

and a chlorine-containing monosilane having the general formula $$R'_nSiCl_{4-n};$$

(ii) a mixture of chlorine-containing disilanes lhaving the general formula $$(Cl_aR_bSi)_2$$

mixed with a chlorine-containing monosilane having the general formula $$R'_nSiCl_{4-n}$$

or (iii) a mixture of chlorine-containing disilanes having the general formula $$(Cl_aR_bSi)_2$$

mixed with a mixture of chlorine-containing monosilanes having the general formula $$R'_nSiCl_{4-n}$$

at a temperature in the range of 25° C. to 300° C. while distilling by-produced volatile products, wherein R is vinyl, an alkyl radical of 1–3 carbon atoms or the phenyl group;

R' is vinyl, hydrogen, an alkyl group of 1–3 carbon atoms or the phenyl group;

a has a value of 0.5–3;

b has a value of 0–2.5;

n has a value of 0, 1, 2 or 3 and the sum of a+b is equal to three.

89. A process as claimed in claim 88 wherein in the mixture of chlorine-containing disilanes and chlorine-containing monosilanes, there is present at least 50 weight percent disilanes, based on the total weight of silanes.

* * * * *